(12) United States Patent
Phillips et al.

(10) Patent No.: US 12,204,120 B2
(45) Date of Patent: *Jan. 21, 2025

(54) OPTICALLY VARIABLE SECURITY DEVICES

(71) Applicant: VIAVI SOLUTIONS INC., Chandler, AZ (US)

(72) Inventors: Roger W. Phillips, Santa Rosa, CA (US); Thomas Mayer, Bogart, GA (US); Scott Lamar, Santa Rosa, CA (US); Elena Taguer, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,528

(22) Filed: May 30, 2023

(65) Prior Publication Data
US 2023/0305202 A1 Sep. 28, 2023

Related U.S. Application Data

(60) Continuation of application No. 17/955,454, filed on Sep. 28, 2022, now Pat. No. 11,768,321, which is a
(Continued)

(51) Int. Cl.
*G02B 5/18* (2006.01)
*B32B 37/12* (2006.01)
(Continued)

(52) U.S. Cl.
CPC ............ *G02B 5/18* (2013.01); *B32B 37/1284* (2013.01); *B32B 37/18* (2013.01); *B42D 25/00* (2014.10); *B42D 25/29* (2014.10); *B42D 25/328* (2014.10); *B42D 25/47* (2014.10); *G02B 5/0808* (2013.01); *G02B 5/285* (2013.01); *G02B 5/32* (2013.01);
(Continued)

(58) Field of Classification Search
None
See application file for complete search history.

(56) References Cited

U.S. PATENT DOCUMENTS 2,570,856 A 10/1951 Carlton et al.
3,011,383 A 12/1961 Sylvester et al.
(Continued)

FOREIGN PATENT DOCUMENTS

AU 488652 B2 11/1977
CA 2163528 C 12/1998
(Continued)

OTHER PUBLICATIONS

Diffractive Microstructures for Security Applications: M. T. Gale, Paul ScherrerInstitute, Zurich, IEEE Conference Publication London 1991, pp. 205-209, Sep. 16-18, 1991.
(Continued)

*Primary Examiner* — Derek S. Chapel
(74) *Attorney, Agent, or Firm* — Mannava & Kang, P.C.

(57) ABSTRACT

An optical device is formed by hot stamping a demetallized hologram to an optically variable foil or to a coating of optically variable ink. In another embodiment a hologram is hot stamped to a banknote or document printed with a color-shifting ink.

20 Claims, 6 Drawing Sheets

Related U.S. Application Data continuation of application No. 16/425,532, filed on May 29, 2019, now abandoned, which is a division of application No. 14/644,556, filed on Mar. 11, 2015, now abandoned, which is a division of application No. 13/250,480, filed on Sep. 30, 2011, now abandoned, which is a continuation-in-part of application No. 11/738,855, filed on Apr. 23, 2007, now abandoned, and a continuation-in-part of application No. 11/682,059, filed on Mar. 5, 2007, now Pat. No. 8,164,810, said application No. 11/738,855 is a continuation-in-part of application No. 11/682,059, filed on Mar. 5, 2007, now Pat. No. 8,164,810.

(60) Provisional application No. 60/861,608, filed on Nov. 29, 2006, provisional application No. 60/832,826, filed on Jul. 24, 2006, provisional application No. 60/747,142, filed on May 12, 2006, provisional application No. 60/744,842, filed on Apr. 14, 2006, provisional application No. 60/779,484, filed on Mar. 6, 2006.

(51) Int. Cl.
| | |
|---|---|
| *B32B 37/18* | (2006.01) |
| *B42D 25/00* | (2014.01) |
| *B42D 25/29* | (2014.01) |
| *B42D 25/328* | (2014.01) |
| *B42D 25/47* | (2014.01) |
| *G02B 5/08* | (2006.01) |
| *G02B 5/28* | (2006.01) |
| *G02B 5/32* | (2006.01) |
| *G03H 1/00* | (2006.01) |
| *G03H 1/02* | (2006.01) |
| *G03H 1/18* | (2006.01) |

(52) U.S. Cl.
CPC ........ *G03H 1/0011* (2013.01); *G03H 1/0256* (2013.01); *B32B 2425/00* (2013.01); *B32B 2551/00* (2013.01); *G03H 1/0244* (2013.01); *G03H 2001/188* (2013.01); *G03H 2210/55* (2013.01); *G03H 2250/10* (2013.01); *G03H 2270/12* (2013.01); *G03H 2270/24* (2013.01); *Y10T 156/10* (2015.01)

(56) References Cited

U.S. PATENT DOCUMENTS

| | | |
|---|---|---|
| 3,123,490 A | 3/1964 | Bolomey et al. |
| 3,293,331 A | 12/1966 | Doherty |
| 3,338,730 A | 8/1967 | Slade et al. |
| 3,610,721 A | 10/1971 | Abramson et al. |
| 3,627,580 A | 12/1971 | Krall |
| 3,633,720 A | 1/1972 | Tyler |
| 3,676,273 A | 7/1972 | Graves |
| 3,790,407 A | 2/1974 | Merten et al. |
| 3,791,864 A | 2/1974 | Steingroever |
| 3,845,499 A | 10/1974 | Ballinger |
| 3,853,676 A | 12/1974 | Graves |
| 3,873,975 A | 3/1975 | Miklos et al. |
| 4,011,009 A | 3/1977 | Lama et al. |
| 4,054,922 A | 10/1977 | Fichter |
| 4,066,280 A | 1/1978 | LaCapria |
| 4,099,838 A | 7/1978 | Cook et al. |
| 4,126,373 A | 11/1978 | Moraw |
| 4,155,627 A | 5/1979 | Gale et al. |
| 4,168,983 A | 9/1979 | Vittands et al. |
| 4,186,943 A | 2/1980 | Lee |
| 4,197,563 A | 4/1980 | Michaud |
| 4,244,998 A | 1/1981 | Smith |
| 4,271,782 A | 6/1981 | Bate et al. |
| 4,310,584 A | 1/1982 | Cooper et al. |
| 4,398,798 A | 8/1983 | Krawczak et al. |
| 4,434,010 A | 2/1984 | Ash |
| 4,543,551 A | 9/1985 | Petersen |
| 4,657,349 A | 4/1987 | Labes et al. |
| 4,705,300 A | 11/1987 | Berning et al. |
| 4,705,356 A | 11/1987 | Berning et al. |
| 4,721,217 A | 1/1988 | Phillips et al. |
| 4,756,557 A | 7/1988 | Kaule et al. |
| 4,756,771 A | 7/1988 | Brodalla et al. |
| 4,779,898 A | 10/1988 | Berning et al. |
| 4,788,116 A | 11/1988 | Hochberg |
| 4,838,648 A | 6/1989 | Phillips et al. |
| 4,856,857 A | 8/1989 | Takeuchi et al. |
| 4,867,793 A | 9/1989 | Franz et al. |
| 4,930,866 A | 6/1990 | Berning et al. |
| 4,931,309 A | 6/1990 | Komatsu et al. |
| 5,002,312 A | 3/1991 | Phillips et al. |
| 5,009,486 A | 4/1991 | Dobrowolski et al. |
| 5,059,245 A | 10/1991 | Phillips et al. |
| 5,079,058 A | 1/1992 | Tomiyama et al. |
| 5,079,085 A | 1/1992 | Hashimoto et al. |
| 5,084,351 A | 1/1992 | Philips et al. |
| 5,106,125 A | 4/1992 | Antes |
| 5,128,779 A | 7/1992 | Mallik |
| 5,135,812 A | 8/1992 | Phillips et al. |
| 5,142,383 A | 8/1992 | Mallik |
| 5,171,363 A | 12/1992 | Phillips et al. |
| 5,177,344 A | 1/1993 | Pease |
| 5,186,787 A | 2/1993 | Phillips et al. |
| 5,192,611 A | 3/1993 | Tomiyama et al. |
| 5,214,530 A | 5/1993 | Coombs et al. |
| 5,223,360 A | 6/1993 | Prengel et al. |
| 5,254,390 A | 10/1993 | Lu |
| 5,278,590 A | 1/1994 | Phillips et al. |
| 5,279,657 A | 1/1994 | Phillips et al. |
| 5,314,767 A | 5/1994 | Bussard |
| 5,331,443 A | 7/1994 | Stanisci |
| 5,339,737 A | 8/1994 | Lewis et al. |
| 5,364,467 A | 11/1994 | Schmid et al. |
| 5,364,689 A | 11/1994 | Kashiwagi et al. |
| 5,368,898 A | 11/1994 | Akedo |
| 5,411,296 A | 5/1995 | Mallik |
| 5,424,119 A | 6/1995 | Phillips et al. |
| 5,437,931 A | 8/1995 | Tsai et al. |
| 5,447,335 A | 9/1995 | Haslop |
| 5,464,710 A | 11/1995 | Yang |
| 5,474,814 A | 12/1995 | Komatsu et al. |
| 5,549,774 A | 8/1996 | Miekka et al. |
| 5,549,953 A | 8/1996 | Li |
| 5,571,624 A | 11/1996 | Phillips et al. |
| 5,591,527 A | 1/1997 | Lu |
| 5,613,022 A | 3/1997 | Odhner et al. |
| 5,624,076 A | 4/1997 | Miekka et al. |
| RE35,512 E | 5/1997 | Nowak et al. |
| 5,627,663 A | 5/1997 | Horan et al. |
| 5,629,068 A | 5/1997 | Miekka et al. |
| 5,630,877 A | 5/1997 | Kashiwagi et al. |
| 5,648,165 A | 7/1997 | Phillips et al. |
| 5,650,248 A | 7/1997 | Miekka et al. |
| 5,672,410 A | 9/1997 | Miekka et al. |
| 5,686,504 A | 11/1997 | Ang |
| 5,700,550 A | 12/1997 | Uyama et al. |
| 5,742,411 A | 4/1998 | Walters |
| 5,744,223 A | 4/1998 | Abersfelder et al. |
| 5,763,086 A | 6/1998 | Schmid et al. |
| 5,766,738 A | 6/1998 | Phillips et al. |
| 5,811,775 A | 9/1998 | Lee |
| 5,815,292 A | 9/1998 | Walters |
| 5,856,048 A | 1/1999 | Tahara et al. |
| 5,858,078 A | 1/1999 | Andes et al. |
| 5,907,436 A | 5/1999 | Perry et al. |
| 5,912,767 A | 6/1999 | Lee |
| 5,913,543 A | 6/1999 | Curiel |
| 5,989,626 A | 11/1999 | Coombs et al. |
| 5,991,078 A | 11/1999 | Yoshitake et al. |
| 6,013,370 A | 1/2000 | Coulter et al. |
| 6,031,457 A | 2/2000 | Bonkowski et al. |
| 6,033,782 A | 3/2000 | Hubbard et al. |

(56) References Cited

U.S. PATENT DOCUMENTS

| | | |
|---|---|---|
| 6,043,936 A | 3/2000 | Large |
| 6,045,230 A | 4/2000 | Dreyer et al. |
| 6,068,691 A | 5/2000 | Miekka et al. |
| 6,082,778 A | 7/2000 | Solmsdorf |
| 6,103,361 A | 8/2000 | Batzar et al. |
| 6,112,388 A | 9/2000 | Kimoto et al. |
| 6,114,018 A | 9/2000 | Phillips et al. |
| 6,150,022 A | 11/2000 | Coulter et al. |
| 6,157,489 A | 12/2000 | Bradley, Jr. et al. |
| 6,168,100 B1 | 1/2001 | Kato et al. |
| 6,241,858 B1 | 6/2001 | Phillips et al. |
| 6,242,510 B1 | 6/2001 | Killey |
| 6,243,204 B1 | 6/2001 | Bradley, Jr. et al. |
| 6,403,169 B1 | 6/2002 | Hardwick et al. |
| 6,549,131 B1 | 4/2003 | Cote et al. |
| 6,586,098 B1 | 7/2003 | Coulter et al. |
| 6,589,331 B2 | 7/2003 | Ostertag et al. |
| 6,616,190 B1 | 9/2003 | Jotcham |
| 6,643,001 B1 | 11/2003 | Faris |
| 6,649,256 B1 | 11/2003 | Buczek et al. |
| 6,686,027 B1 | 2/2004 | Caporaletti et al. |
| 6,692,031 B2 | 2/2004 | Mcgrew |
| 6,692,830 B2 | 2/2004 | Argoitia et al. |
| 6,712,399 B1 | 3/2004 | Drinkwater et al. |
| 6,749,777 B2 | 6/2004 | Argoitia et al. |
| 6,749,936 B2 | 6/2004 | Argoitia et al. |
| 6,751,022 B2 | 6/2004 | Phillips |
| 6,759,097 B2 | 7/2004 | Phillips et al. |
| 6,761,378 B2 | 7/2004 | Souparis |
| 6,761,959 B1 | 7/2004 | Bonkowski et al. |
| 6,808,806 B2 | 10/2004 | Phillips et al. |
| 6,815,065 B2 | 11/2004 | Argoitia et al. |
| 6,818,299 B2 | 11/2004 | Phillips et al. |
| 6,838,166 B2 | 1/2005 | Phillips et al. |
| 6,841,238 B2 | 1/2005 | Argoitia et al. |
| 6,902,807 B1 | 6/2005 | Argoitia et al. |
| 6,903,850 B2 | 6/2005 | Kay et al. |
| 6,987,590 B2 | 1/2006 | Phillips et al. |
| 7,005,178 B2 | 2/2006 | Bonkowski et al. |
| 7,029,525 B1 | 4/2006 | Mehta |
| 7,029,745 B2 | 4/2006 | Bonkowski et al. |
| 7,047,883 B2 | 5/2006 | Raksha et al. |
| 7,054,042 B2 | 5/2006 | Holmes et al. |
| 7,081,819 B2 | 7/2006 | Cortina et al. |
| 7,089,420 B1 | 8/2006 | Durst et al. |
| 7,169,472 B2 | 1/2007 | Raksha et al. |
| 7,224,528 B2 | 5/2007 | Phillips et al. |
| 7,229,520 B2 | 6/2007 | Huang et al. |
| 7,241,489 B2 | 7/2007 | Argoitia et al. |
| 7,258,900 B2 | 8/2007 | Raksha et al. |
| 7,258,915 B2 | 8/2007 | Argoitia et al. |
| 7,300,695 B2 | 11/2007 | Argoitia et al. |
| 11,768,321 B2 * | 9/2023 | Phillips ............... B42D 25/328 156/60 |
| 2002/0182383 A1 | 12/2002 | Phillips et al. |
| 2003/0058491 A1 | 3/2003 | Holmes et al. |
| 2003/0087070 A1 | 5/2003 | Souparis |
| 2003/0190473 A1 | 10/2003 | Argoitia et al. |
| 2004/0009309 A1 | 1/2004 | Raksha et al. |
| 2004/0028905 A1 | 2/2004 | Phillips et al. |
| 2004/0051297 A1 | 3/2004 | Raksha et al. |
| 2004/0081807 A1 | 4/2004 | Bonkowski et al. |
| 2004/0094850 A1 | 5/2004 | Bonkowski et al. |
| 2004/0100707 A1 | 5/2004 | Kay et al. |
| 2004/0101676 A1 | 5/2004 | Phillips et al. |
| 2004/0105963 A1 | 6/2004 | Bonkowski et al. |
| 2004/0151827 A1 | 8/2004 | Argoitia et al. |
| 2004/0166308 A1 | 8/2004 | Raksha et al. |
| 2004/0180168 A1 | 9/2004 | Rancien et al. |
| 2005/0037192 A1 | 2/2005 | Argoitia et al. |
| 2005/0063067 A1 | 3/2005 | Phillips et al. |
| 2005/0106367 A1 | 5/2005 | Raksha et al. |
| 2005/0123755 A1 | 6/2005 | Argoitia et al. |
| 2005/0127663 A1 | 6/2005 | Heim |
| 2005/0128543 A1 | 6/2005 | Phillips et al. |
| 2005/0181166 A1 | 8/2005 | Rancien |
| 2005/0189060 A1 | 9/2005 | Huang et al. |
| 2006/0035080 A1 | 2/2006 | Argoitia |
| 2006/0077496 A1 | 4/2006 | Argoitia et al. |
| 2006/0194040 A1 | 8/2006 | Raksha et al. |
| 2006/0255586 A1 | 11/2006 | Lazzerini |
| 2006/0263539 A1 | 11/2006 | Argoitia |
| 2006/0285184 A1 | 12/2006 | Phillips et al. |
| 2007/0058227 A1 | 3/2007 | Raksha et al. |
| 2008/0069979 A1 | 3/2008 | Raksha et al. |

FOREIGN PATENT DOCUMENTS

| | | |
|---|---|---|
| DE | 1696245 A1 | 1/1972 |
| DE | 3932505 A1 | 4/1991 |
| DE | 4212290 C1 | 5/1993 |
| DE | 4343387 A1 | 6/1995 |
| DE | 19611383 A1 | 9/1997 |
| DE | 19731968 A1 | 1/1999 |
| DE | 19744953 A1 | 4/1999 |
| DE | 19639165 C2 | 10/2003 |
| EP | 0138194 A2 | 4/1985 |
| EP | 0185396 A2 | 6/1986 |
| EP | 0341002 A2 | 11/1989 |
| EP | 0420261 A2 | 4/1991 |
| EP | 0453131 A2 | 10/1991 |
| EP | 0556449 A1 | 8/1993 |
| EP | 0406667 B1 | 1/1995 |
| EP | 0170439 B2 | 4/1995 |
| EP | 0660262 A2 | 6/1995 |
| EP | 0710508 A1 | 5/1996 |
| EP | 0756945 A1 | 2/1997 |
| EP | 0395410 B1 | 8/1997 |
| EP | 0698256 B1 | 10/1997 |
| EP | 0741370 B1 | 8/1998 |
| EP | 0953937 A1 | 11/1999 |
| EP | 0978373 A2 | 2/2000 |
| EP | 1174278 A1 | 1/2002 |
| EP | 1239307 A1 | 9/2002 |
| EP | 1353197 A2 | 10/2003 |
| EP | 0914261 B1 | 12/2004 |
| EP | 1498545 A1 | 1/2005 |
| EP | 1516957 A1 | 3/2005 |
| EP | 1529653 A1 | 5/2005 |
| EP | 1719636 A1 | 11/2006 |
| EP | 1741757 A1 | 1/2007 |
| GB | 1107395 A | 3/1968 |
| GB | 1127043 A | 9/1968 |
| GB | 1131038 A | 10/1968 |
| JP | 63172779 A | 7/1988 |
| JP | 11010771 A | 1/1999 |
| WO | 1988007214 A1 | 9/1988 |
| WO | 9323251 A1 | 11/1993 |
| WO | 1995013569 A1 | 5/1995 |
| WO | 9517475 A1 | 6/1995 |
| WO | 9719820 A1 | 6/1997 |
| WO | 1998012583 A1 | 3/1998 |
| WO | 9825236 A1 | 6/1998 |
| WO | 2000008596 A1 | 2/2000 |
| WO | 2001003945 A1 | 1/2001 |
| WO | 0107268 A1 | 2/2001 |
| WO | 2001053113 A1 | 7/2001 |
| WO | 2002000446 A1 | 1/2002 |
| WO | 2002004234 A1 | 1/2002 |
| WO | 2002040599 A1 | 5/2002 |
| WO | 2002040600 A1 | 5/2002 |
| WO | 2002053677 A1 | 7/2002 |
| WO | 2002090002 A2 | 11/2002 |
| WO | 03011980 A1 | 2/2003 |
| WO | 2003102084 A1 | 12/2003 |
| WO | 2004014665 A1 | 2/2004 |
| WO | 2004024836 A2 | 3/2004 |

(56) References Cited

FOREIGN PATENT DOCUMENTS

| WO | 2005017048 | A2 | 2/2005 |
|---|---|---|---|
| WO | 2005026848 | A2 | 3/2005 |

OTHER PUBLICATIONS

"Influence of N anosized Metal Clusters on the Generation of Strong Colors andControlling of their Properties through Physical Vapor Deposition (PVD)" by R.Domnick et al., 49th Annual Technical Conference Proceedings (2006), Society ofVacuum Coaters, 4 pages.
"Optical Thin-Fihn Security Devices", J.A. Dobrowolski, Optical Security Document, Rudolf Van Renesse, Artech House, 1998, pp. 289-328.
"Paper Based Document Security—a Review" Rudolf L. van Renesse, EuropeanConference on Security and Detection, Apr. 28-30, 1997, Conference Publication No. 437, p. 75-80.
"Research on thin film anticounterfeiting coatings at the National Research Council of Canada", J. A. Dobrowolski et al., Applied Optics, vol. 28, No. 14, Jul. 15, 1989, pp. 2702-2717.
"Security Enhancement of Holograms with Interference Coatings" by Phillips et al. Optical Security and Counterfeit Deterrence Techniques III Proceedings of SPIE vol. 3973 p. 304-316 (2000).
Alberto Argoitia, "Pigments Exhibiting a Combination of Thin Film and DiffractiveLight Interference", AIMCAL Fall Technical Conference, 16.sup.th InternationalVacuum Web Coating Conference, Jan. 2002, pp. 1-9.
Argoitia et al, "Pigments Exhibiting Diffractive Effects", Soc. Of Vac. Coaters, 45thAnnual Tech. Conf. Proceed. (2002), 10 pages.
Argoitia et al, "The concept of printable holograms through the alignment ofdiffractive pigments", SPIE Conference on Document Security, Jan. 2004, 14 pages.
Coombs et al, "Integration of contracting technologies into advanced optical securitydevices", SPIE Conference on Document Security, Jan. 2004.
Definition of "directly" from Webster's Third New International Dictionary, 1993, p. 641.
Don W. Tomkins, Kurz Hastings, "Transparent Overlays for Security Printing andPlastic ID Cards", Nov. 1997, pp. 1-8.
EP Appln No. 07251793.1 Search Report Dec. 12, 2012.
Frans Defilet, LGZ Landis & Gyr Zug Corporation, "Kinegrams 'Optical VariableDevices' (OVDs) for Banknotes, Security Documents and Plastic Cards", San Diego, Apr. 1-3, 1987.
Halliday et al, "Fundamental of Physics, Sixth Edition", p. 662, Jul. 2000.
Hardin, "Optical tricks designed to foil conterfeiters" OE Reports, No. 191, Nov. 1999, 4 pages.
Himpsel et al, "Nanowires by Step Decoration", Mat. Research Soc. Bui., p. 20-24 (Aug. 1999).
I.M. Boswarva et al., "Roll Coater System for the Production of Optically VariableDevices (OVDs) for Security Applications", Proceedings, 33rd Annual TechnicalConference, Society of Vacuum Coaters, 1990, pp. 103-109.
J. Rolfe, "Optically Variable Devices for Use on Bank Notes, SPIE, vol. 1210 OpticalSecurity and Anticounterfeiting Systems", 1990, pp. 14-19.
J.A. Dobrowolski, K.M. Baird, P.D. Carman, and A. Waldorg, "Optical InterferenceCoatings for Inhibiting of Counterfeiting", Optica Acta, 1973, vol. 20, No. 12, pp. 925-937.
Jeffrey I. Zink et al., "Optical Probes and Properties of Alumninosilicate GlassesPrepared by the Sol-Gel Method", Polym. Mater Sci. Eng., 1989, pp. 204-208.
John M. McKiernan et al., "Luminescence and Laser Action of Coumarin Dyes Dopedin Silicate and Aluminosilicate Glasses Prepared by the Sol-Gel Technique", Journal ofInorganic and Organometallic Polymers, vol. 1, No. 1, 1991, pp. 87-103.
Llewellyn, "Dovids: Functional Beauty—discussion about holography", Paper, Film, and Foil Converter, Aug. 2002, 7 pages.
Lotz et al., Optical Layers on Large Area Plastic Films, Precision, Applied Films(Nov. 2001), 3 pages.
Minolta Manual for Precise Color Communication, Color Control From Feeling toInstrumentation, pp. 18, 20, 22, 23, 46, 47, 48 and 49.
Notification of the First Office Action on Chinese Patent Publication No. 101058285, Nov. 6, 2009, pp. 1-2.
OVD Kinegram Cor, "OVD Kinegram Management of Light to Provide Security", Internet site www.kiknegram.com/xhome/home.html, Dec. 17, 1999.
Powell et al, (Ed.), Vapor Deposition, John Wiley & Sons, p. 132 (1996).
Prokes et al (Ed.), Novel Methods of Nanoscale Wire Formation, Mat. Research Soc.Bui., pp. 13-14 (Aug. 1999).
Roger W. Philips, and Anton F. Bleikolm, "Optical Coatings for Document Security", Applied Optics, vol. 35, No. 28, Oct. 1, 1996., pp. 5529-5534.
Roger W. Phillips, "Optically Variable Films, Pigments, and Inks", SPIE vol. 1323, Optical Thin Films III: New Development, 1990, pp. 98-109.
RudolfL. van Renesse, "Security Design of Valuable Documents and Products", SPIE, vol. 2659, Jun. 1996, pp. 10-20.
S.P. McGrew, "Hologram Counterfeiting: Problems and Solutions", SPIE, vol. 1210Optical Security and Counterfeiting Systems, 1990, pp. 66-76.
Steve McGrew, "Countermeasures Against hologram Counterfeiting", Internet site www.iea.com/nli/publications/contermeasuers.htm, Jan. 6, 2000, 18 pages.
The Mearl Corporation brochure for "Mearl Iridescent Film", Peeksill, NY. 1 page.
The R.D. Mathis Company Manual for "Thin Film Evaporation Source Reference", Long Beach, CA. 10 Pages.
Van Renesse (Ed.), Optical Document Security, 2nd Ed., Artech house, 254, 349-369(1997).

* cited by examiner

OPTICALLY VARIABLE SECURITY DEVICES

CROSS-REFERENCE TO RELATED APPLICATIONS

This application is a continuation of commonly assigned and co-pending U.S. patent application Ser. No. 17/955,454 filed Sep. 28, 2022, which is a continuation of commonly assigned and co-pending U.S. patent application Ser. No. 16/425,532, filed May 29, 2019, which is a divisional of commonly assigned and co-pending U.S. patent application Ser. No. 14/644,556, filed Mar. 11, 2015, which is a divisional of U.S. patent application Ser. No. 13/250,480, filed Sep. 30, 2011, which is a continuation-in-part of U.S. patent application Ser. No. 11/682,059 filed Mar. 5, 2007, which claims priority from U.S. provisional application No. 60/861,608 filed on Nov. 29, 2006, U.S. provisional application No. 60/832,826 filed on July 24,2006, U.S. provisional application No. 60/744,842 filed on Apr. 14, 2006, and U.S. provisional application No. 60/779,484 filed on Mar. 6, 2006, which are incorporated herein by reference for all purposes. U.S. patent application Ser. No. 13/250,480 is a continuation-in-part of U.S. patent application Ser. No. 11/738,855 filed on Apr. 23, 2007, which claims priority of U.S. provisional application No. 60/747, 142 filed May 12, 2006. Application Ser. No. 11/738,855 is a continuation-in-part of U.S. patent application Ser. No. 11/682,059 filed Mar. 5, 2007, which claims priority from U.S. provisional application No. 60/861,608 filed on Nov. 29, 2006; U.S. provisional application No. 60/832,826 filed on Jul. 24, 2006; U.S. provisional application No. 60/744,842 filed on Apr. 14, 2006; and U.S. provisional application No. 60/779,484 filed on Mar. 6, 2006, which are incorporated herein by reference for all purposes. These applications are all incorporated herein by reference for all purposes.

All patents and patent applications mentioned heretofore and hereafter are incorporated herein by reference, for all purposes.

FIELD OF THE INVENTION

The present invention is related generally to hot-stamping and more particularly, to the production of an optical device by hot-stamping a diffractive and optically variable portions of the device together.

BACKGROUND OF THE INVENTION

U.S. Pat. No. 6,987,590 in the name of Phillips et al., discloses an optical device that includes a light transmissive substrate having a surface relief pattern applied thereon, in the form of a hologram. In fabricating this optical device a patterned layer of a reflective material is applied over portions of the surface relief pattern so as to form alphanumeric characters, bars codes, or pictorial or graphical designs. An optically active coating is deposited or applied as an ink or paint over the patterned layer of reflective material and exposed portions of the surface relief pattern in order to provide desirable optical effects to the exposed portions of the surface relief pattern. In some embodiments, the optically active coating is a color shifting thin film, or contains color shifting flakes. Optionally, the material of the optically active coating is index matched to the light transmissive substrate in order to optically erase the effect of the surface relief pattern in the portions of the surface relief pattern not covered by the reflective material. This aforementioned patent application provides an optical structure having a light transmissive substrate having a surface relief pattern formed thereon; a patterned layer of a reflective material applied onto portions of the surface relief pattern of the light transmissive substrate, such that some portions of the surface relief pattern are covered by the reflective material, and other portions of the surface relief pattern are exposed. The structure further has an optically active coating underlying the patterned layer and exposed portions of the surface relief pattern. This structure is a type of chromagram.

The term chromagram used hereafter is meant to include optical structures that have a patterned or windowed substrate together with special effect coatings or layers supported by or supporting the patterned or windowed substrate. Chromagrams of various designs are known from our patent applications and used as security devices or for enhancing the security of products and for their aesthetic appeal.

By use of the term "patterned" layer, it is meant that a reflective, opaque, or partially transmissive layer is applied over a substrate which may be planar or have a surface relief pattern therein, in a manner that forms a desired "pattern" or design. By way of non-limiting examples, the patterned reflective layer can be formed in the shape of letters, numerals, bar codes and/or graphical or pictorial designs.

One type of chromagram is an optical structure that exhibits the effects of stamped or etched surface relief patterns, such as holograms or diffractive gratings together with a pattern such as alphanumeric characters, bar codes, or graphical or pictorial designs, and additional optical effects in the regions around such pattern. Such structures are described in United States Patent application 2006077496 in the name of Argoitia et al. published Apr. 13, 2006. Another chromagram-type structure is described in United States Patent application 20050128543 in the name of Phillips et al. In this publication patterned substrates having windowed regions that one can see through, are coated with optically variable coatings or optically variable inks that can be seen through the windows. For all intents and purposes, all references described heretofore or hereafter are incorporated herein by reference.

United States patent application 20070058227 in the name of Raksha et al., discloses an optical device comprising a hologram and a layer of color-shifting magnetically aligned flakes together forming an image that is difficult to counterfeit and is highly attractive. Optionally, a transparent diffractive grating is laminated to a magnetically formed image.

Although not limited thereto, this invention primarily relates to types of Chromagrams that combine security features of a hologram and a color shifting layer conveniently joined by an adhesive layer. This invention also relates to chromagrams having a windowed or patterned substrate adhesively joined to a layer of foil.

A key aspect of such chromagrams is that one layer having transmissive regions and some optical feature such as a hologram or a patterned opaque or patterned partially transmissive regions is hot stamped to another layer, web or substrate that has optical features that can be seen through the windows. This is a significant departure from prior art Chromagrams and windowed optical structures. Of course hot stamping, a dry process, is well known, however is typically used to hot stamp a device or security device such as a hologram to an object or substrate. Hot stamp transfer foils have been provided in conjunction with hot stamp machines to affix images onto various substrates such as paper, plastic film and even rigid substrates.

One commercially available machine for hot stamping images onto substrates is the Malahide E4-PK produced by Malahide Design and Manufacturing Inc. Machines of this type are shown and described on the Internet at www.hot-stamping.com. Simplistically, in a hot-stamping process, a die is attached to the heated plate which is pressed against a load roll of hot stamping foil to affix the foil to an article or substrate.

Hot stamping is described or mentioned in the U.S. Pat. Nos. 5,002,312, 5,059,245, 5,135,812, 5,171,363, 5,186,787, 5,279,657 and 7,005,178, in the name of Roger Phillips of Flex Products Inc. of Santa Rosa Ca.

A novel and inventive aspect of this invention is to provide a process and device made by the process for fabricating a security device, by using hot stamping to make the security device, which may then be further hot stamped to an object or substrate.

Heretofore chromagrams or layered security devices have been fabricated by depositing or coating one layer of material over another onto a substrate. Generally, such process would be done in a single manufacturing facility. However, is has been discovered that some facilities are better equipped or have persons better skilled at producing some coatings and substrates, than others. For example we have found that some off-shore manufacturing facilities produce excellent windowed or reflective patterned substrates and also have staff very skilled in the manufacture of holograms or diffraction gratings within the substrate supporting the windowed coating. We have also found that our facility in the United States produces very high quality coatings and pigments such as optically variable foils and flakes.

This invention provides a means for manufacturing a first coated substrate in one location and a second coated substrate in a second location and marrying together the two coatings to form a single optical device that can be applied to a substrate or object. A novel aspect of this invention is that one of the coatings is adhesively bonded to the second coating by way of hot stamping in such a manner as to allow a first coating to be visible through windows or uncoated regions in the second coating. This is a significant departure from the way in which these optical structures were formed in the past, where each of the layers were coated one after the other to form the desired chromagram.

It is another object of this invention, to provide a hot stamp image with multilayer security features.

SUMMARY OF THE INVENTION

A method is provided for manufacturing a device. The method includes: a) providing a diffractive structure for forming at least a portion of an image; b) providing an optically variable structure separate from the diffractive structure, for providing an optically variable feature to the image; c) covering the diffractive structure or the optically variable structure with an adhesive, wherein the adhesive comprises energy activated binder; and d) after steps (a)-(c), activating the adhesive and coupling the diffractive structure and optically variable structure together in a predetermined mutual arrangement, wherein the energy activated binder forms an adhesive layer.

In accordance with one aspect of this invention, a device is provided, comprising: a diffractive structure for forming at least a portion of the image; an optically variable structure for providing the optically variable feature to the image; and an adhesive layer for coupling the diffractive structure and optically variable structure in a predetermined mutual arrangement. The adhesive between the diffractive structure and the optically variable structure is an internal adhesive layer of the device. Additionally, an external adhesive layer may be provided to the diffractive structure or the optically variable structure for attaching the device to an object.

In accordance with another aspect of this invention, a method for forming a device is provided, comprising the steps of:

a) providing an optically variable foil;
b) covering the optically variable foil with an adhesive;
c) providing a hologram adjacent to the adhesive; and
d) hot stamping the hologram and optically variable foil together by heating the adhesive while applying pressure to the hologram and optically variable foil.

In an embodiment of the instant invention an adhesive material on a de-metalized surface of a hologram is followed underneath with an optically variable ink that has already been applied to the banknote or substrate.

In an embodiment of this invention optically variable ink is first printed on a substrate followed by hot-stamp process bonding together the optically variable ink layer with a substrate having a windowed hologram.

In yet an alternative embodiment banknote or document has hot stamped thereon a demetallized hologram, wherein the hot stamp adhesive has optically variable flakes mixed therein in direct contact with the demetallized surface of a hologram.

In an aspect of the invention the optically variable ink can be seen through portions of the de-metalized hologram or where both can be seen at the same time.

In accordance with the invention there is provided a demetallized hologram or windowed hologram hot stamped on to an optically variable foil.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is to be appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
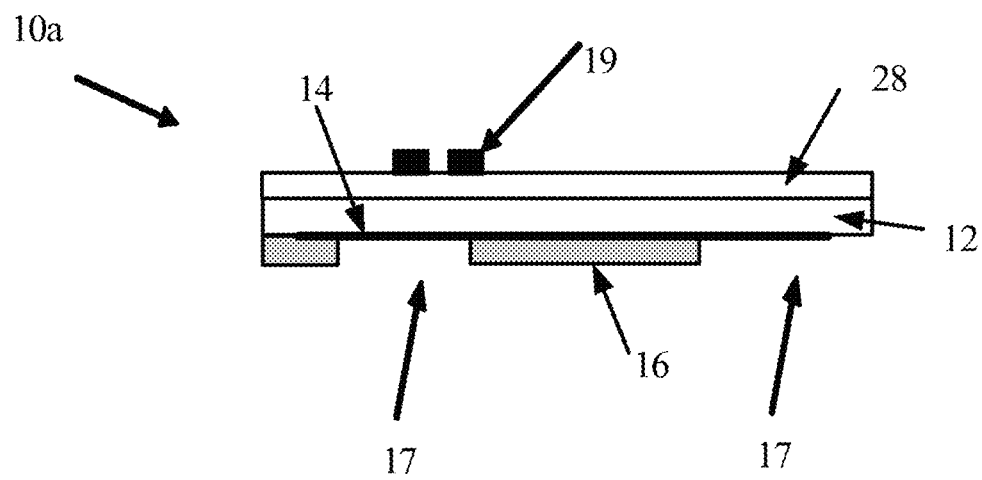
FIG. 1*a* is a cross sectional drawing illustrating the manufacture of a portion of chromagram in accordance with the teachings of this invention.

The present invention is related to optical devices wherein a relief structure providing an optical effect such as a hologram or diffraction grating is coupled to an optically variable structure by an adhesive, which may be an energy activated adhesive. The resulting optical structure exhibits unique optical effects.

For the purpose of this application, the term "energy activated adhesive" or "energy activated binder", means a bonding substance that requires an energy source for curing. The energy activated adhesives include, but are not limited to, hot stamp adhesives, UV or e-beam activated adhesives, thermoplastic and thermoset adhesives, paint-based polymeric compositions, varnishes, and staining compositions. By way of example, an adhesive is selected from the group of: polymethacrylate, polyacrylate, polyamide, nitrocellulose, alkyd resin, polyvinyl alcohol, polyvinyl acetate, and polyurethane.

The methods of activating the adhesives include hot stamping, UV curing, applying heat, pressure, or a beam of electrons. For brevity, an energy activated adhesive, possibly with special flakes therein, is referred to as "an adhesive" hereinbelow where it does not lead to confusion.

As was described heretofore, in the background of the invention, the field of hot stamping and more particularly, hot stamping of one optical coating or substrate with another is well known. For example, coated substrates bearing images, logos or other indicia are hot stamped onto lottery cards, passports, banknotes, driver's licenses, poker chips, and a variety of other articles and substrates are well known.

The adhesive may be printed into patterns or flood coated over the entire surface. If patterned, the product becomes more tamper proof since the product cannot be physically removed in one piece. Attempts to remove the device by dissolving the adhesive using solvents would also be detrimental since the solvent would also attack the hardcoat/release which in turn would destroy the device, making tampering obvious.

The device disclosed in the present application comprises a diffractive structure, which can take various conventional forms including diffraction patterns such as diffraction gratings, refraction patterns, holographic patterns such as two-dimensional and three-dimensional holographic images, demetallized holograms, coatings with varied index of refraction, light transmissive dielectric coatings with refractive flakes therein or thereon, Kinegram® devices, Pixelgram® devices, corner cube reflectors, zero order diffraction structures, moiré patterns, and light interference patterns based on microstructures having dimensions of from about 0.1 µm to about 10 µm.

In accordance with one embodiment of the present invention, the diffractive structure comprises a reflector layer, having at least a part demetallized. A demet layer can be made of Al, Cu, Ni, and other metals and metal alloys that have been patterned by demetallization. Various techniques may be used to pattern the metal layer, such as chemical etching or oil ablation in vacuum, both done in registration with the relief image.

In one embodiment of the present invention, the diffractive structure comprises a windowed or segmented opaque layer having one or more light transmissive windows to allow combining of optical effects provided by the diffractive and optically variable structures, so that the optically variable structure is visible through said windows when the device is viewed from the side of the diffractive structure. Preferably, the windowed coating is reflective to provide an additional security feature.

The diffractive structure may be embossed on an embossable resin layer made of such materials as type G PET, Polycarbonate, polyvinyl chloride or polymethacrylate. An embossable layer may be combined with hardcoat/release layer. An embossing may be either patterned or continuous.

The diffractive structure may comprise a grating formed in a substrate, preferably a light transmissive or essentially transparent substrate, which may be made of Polyethylene Terephtalate (PET), Oriented Polypropylene (OPP) or other suitable plastic material. By way of example, a PET layer has a thickness of 6-25 microns.

The diffractive structure may comprise a high refraction index layer coated on a relief pattern, such as an embossed resin layer. The high refraction index layer may be made of a material having the index of refraction no less than 1.65. A high refractive index layer can be made of ZnS, $TiO_2$, $ZrO_2$, etc.

In one embodiment of the present invention, the diffractive structure is visible through the OV structure, so the substrate supporting the diffractive structure may be opaque.

In one embodiment of the present invention, the diffractive structure is a windowed substrate having a coated pattern (e.g., a patterned opaque coating) thereon, wherein regions that are uncoated form windows through which the color shifting background is visible.

The device disclosed in the present application comprises an optically variable structure which, in one embodiment, is a multilayer optical interference film comprising a reflector layer, an absorber layer, and a dielectric layer between the reflector and absorber layers, as it is known in the art. A reflective layer can be made of any metal that has a reflectance over 20%, preferably aluminum. By way of example, a dielectric layer is made of $MgF_2$ or other transparent material as known in the art.

An absorber can be a grey metal with a ratio of n/k about 1, where n is the real part of the refractive index and k is the imaginary part of the reflective index, for example Cr or Ni or other transition metal, or can be a non-selective absorber across the visible spectrum, or can be a cermet, as described in the article entitled "Influence of Nanosized Metal Clusters on the Generation of Strong Colors and Controlling of their Properties through Physical Vapor Deposition (PVD)" by R. Domnick et al., 49th Annual Technical Conference Proceedings (2006), Society of Vacuum Coaters, incorporated herein by reference. By way of example, a cermet material comprises silver islands in a dielectric matrix.

In another embodiment of the present invention, the optically variable structure is a multilayer optical interference film comprising a first and second absorber layers, and a dielectric layer therebetween. This multilayer film configuration is disclosed in U.S. Pat. No. 5,278,590 to Phillips et al. Such a film structure allows optically variable structure 10b to be transparent to light incident upon the surface thereof.

In yet another embodiment, the optically variable structure is a multilayer optical interference film comprising alternating low and high refraction index layers, where the individual layers have an index of refraction between 1.38 and 2.3

In one embodiment of the present invention, the optically variable structure comprises a light transmissive dielectric coating with a plurality of multilayer optical interference flakes therein or thereon. Such flakes are described, for example, in U.S. Pat. No. 6,749,777 granted to Argoitia et al.

Alternatively, the optically variable structure comprises optically variable ink, comprising optical effect flakes in a carrier, wherein the flakes may have one or more predetermined optical characteristics; for example, flakes may be optically variable changing color with a change in angle of incident light, or flakes may be diffractive, or may have covert symbols therein or thereon, or the flakes may simply be reflective or absorptive. In some instances, optical effect flakes have a combination of optical effects, for example, they may be diffractive and color shifting, or they may be diffractive and reflective, or diffractive and highly absorptive depending upon the desired effect. Furthermore, flakes having different optical effects may be mixed together in desired ratios. Pigments that may be added include those based on interference, for example mica based pigments, Fabry Perot type pigments, liquid crystal type pigments, including those that color shift with viewing angle, non-shifting pigments like gold and nickel, and other metallic flakes.

In one embodiment of the present invention, the optically variable ink is printed onto a substrate such as a banknote or any other security document.

The substrate supporting the optically variable structure is either opaque or light-transmissive in various embodiments of the present invention.

FIG. 1a illustrates a process of manufacturing a first portion of a chromagram in accordance with the teachings of this invention. In diffractive structure 10a, substrate 12 having region 14 impressed with a hologram, is partially coated with a pattern of highly reflective aluminum 16 preventing light from passing therethrough. Therefore, when the structure is viewed from the top side, a highly reflective surface is seen where the Al coating 16 is present. Substrate 12, a resin/hardcoat layer in which the embossing 14 is impressed, may have an optional protective coating 28 on its surface, whereon one or more letters, a logo or other indicia 19 is printed. The uncoated portions 17 of the hologram are substantially light transmissive.

Generally, in the prior art manufacture of chromagrams, an optical effect coating would be applied directly over the Al, as well as over the uncoated portions of the light transmissive substrate. However, in accordance with this invention an entirely separate structure 10b shown in FIG. 1b is prepared consisting of a substrate and an optically variable coating, such as a color shifting coating.

Figure 1B:
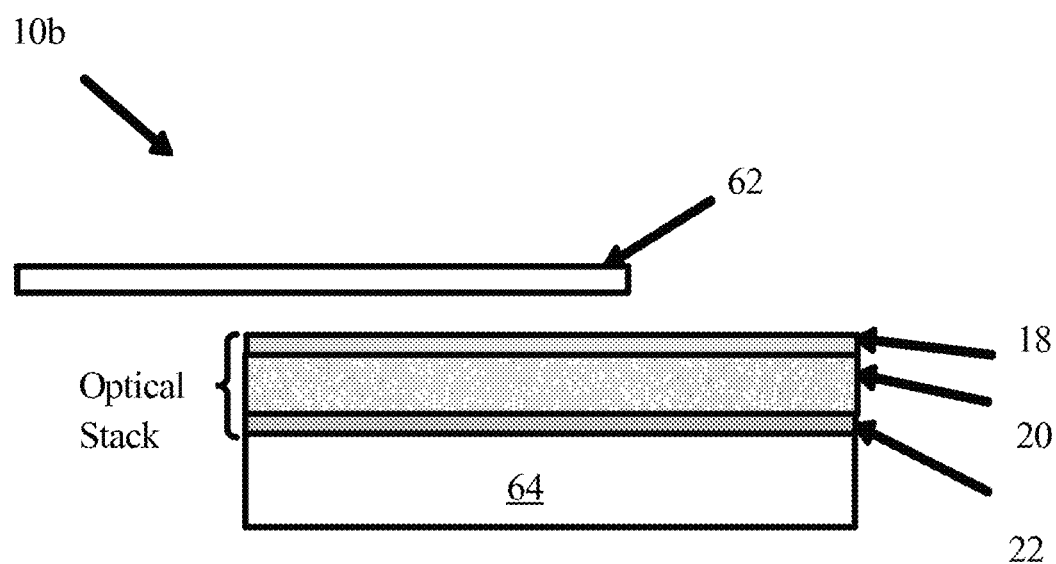
FIG. 1*b* is a cross sectional drawing illustrating the manufacture of a portion of chromagram in accordance with the teachings of this invention.

FIG. 1b illustrates a process of manufacturing a second portion of a chromagram, optically variable structure 10b, in accordance with the teachings of this invention. A substrate made preferably of PET is shown coated with a reflector layer 22, a dielectric layer 20 and an absorber layer 18. A hot stamp adhesive layer 62 which may be 3-10 μm thick is then applied over the optical stack formed by layers 22, 20, and 18 and dried.

A novel and inventive aspect of this invention is the manufacture of a windowed structure, such as diffractive structure 10a, and a separate optically variable structure, such as structure 10b, wherein the two structures can be married or bonded together forming a chromagram by the application of heat and pressure via hot stamping. Each of the first and second structures can vary; several non-limiting examples are given throughout this application.

In embodiments of the present application the hot stamp adhesive can be applied and dried upon either a diffractive structure, structure 10a in the aforedescribed example, or an optically variable structure, such as 10b, or both structures, prior to bonding the two structures together. The thickness for hot stamp adhesive may be between 3 μm and 10 μm, with preferable range 3-7 μm.

Figure 2A:
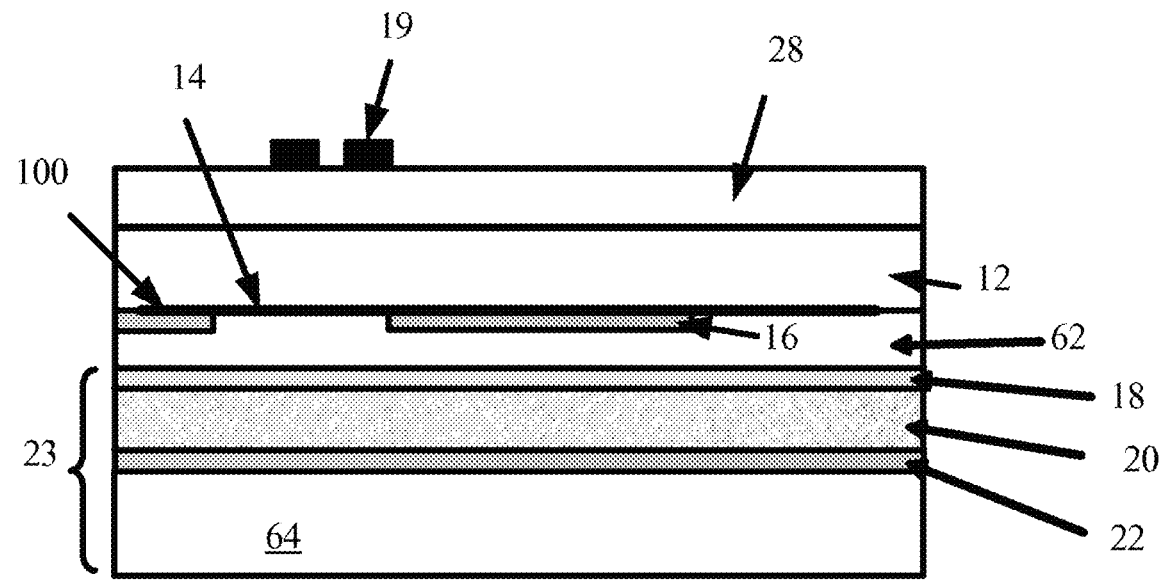
FIG. 2*a* is a cross-sectional view of a Chromagram with an adhesive between an optically variable (OV) foil and demetallized hologram.
Figure 2B:
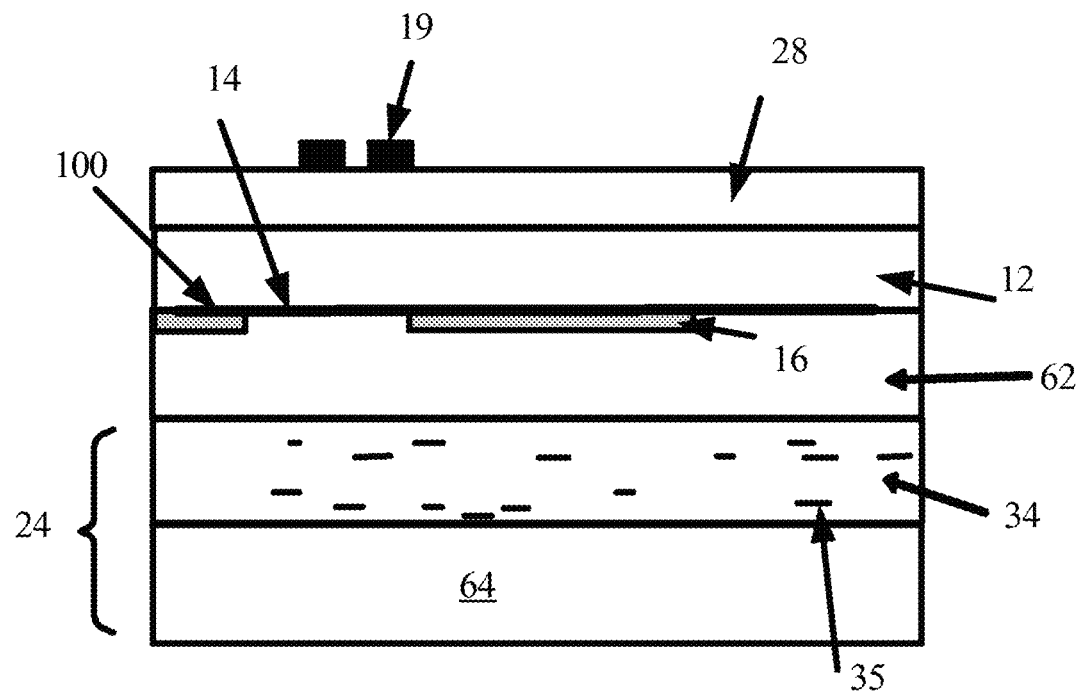
FIG. 2*b* is a cross-sectional view of a Chromagram with an adhesive.

Further described embodiments of the present invention shown in FIGS. 2a and 2b have different optically variable coatings on light transmissive substrate 64. Substrate 64 can be either opaque or light transmissive. Light transmissive substrate 64 provides for viewing the device from both sides, which is advantageous if the optically variable structure is light transmissive, for example made with a light transmissive OV ink or an all dielectric Ab/D/Ab optical stack.

In embodiment shown in FIG. 2a, substrate 64 is coated with reflective layer 22, dielectric layer 20 and absorber layer 18 forming optically variable color shifting foil 23. Substrate 12, which can be a resin/hardcoat layer, has grating 14 thereon partially coated with a pattern of highly reflective coating 16 in contact with portions of the grating 14, for preventing light from passing therethrough. Resin layer 12 is optionally covered with protective light transmissive layer 28 with opaque indicia 19 printed thereon.

FIG. 2a is the result of adhesively joining structures 10a and 10b together. Preferably, grating 14 is embossed onto substrate 12 and covered with patterned demetallized aluminum 16, then the demet hologram is hot stamped or hot roll nipped to the optical stack using clear hot stamp adhesive 62. All that is required to form a chromagram once the structures 10a and 10b are brought together is aligning substrates 12 and 64 so that they are in registry and then the application of heat and pressure in a hot stamp machine.

Preferably, reflective layer 16 is windowed, so that substrate 12 has one or more regions 100 thereon embossed and covered with reflective material, said regions separated by regions 17 shown in FIG. 1a, not covered with aluminum and can be either embossed or not-embossed. It is easier to emboss the whole region and then pattern the Al and then put down the optically matching adhesive. Alternatively, the continuous reflective coating is shifted to one side, the resulting structure has planar reflective coating over non-embossed regions providing highly reflective mirror-like portions of the image as an additional optical effect.

The structure shown in FIG. 2a, when viewed from the top, provides a combined optical effect including a holographic image having windows wherein a color shifting background shows. The combined optical effect is added by printed indicia. When the structure shown in FIG. 2a is viewed through substrate 64, which should be light transmissive for this purpose, just a metallic look arising from the opaque reflector is visible. If the reflector is semi-transmitting, i.e. the thickness of the reflector layer is below the opaque point, then one would see a color shift with a faint reflection hologram showing through at certain locations where aluminum 16 is present. In between the faint reflection hologram replicated by aluminum 16 down one would see images from indicia 19.

Another embodiment of the present invention shown in FIG. 2b is similar to the embodiment shown in FIG. 2a in many respects. However, FIG. 2b includes an optically variable structure 24 that has first substrate 64, preferably made of PET, coated with color shifting flakes 35 in carrier 34, by way of example an adhesive or acrylic-or urethane-based ink, hot stamped to the same upper structure as in FIG. 2a using a hot stamp adhesive 62. After the ink has dried and cured, thus forming a color shifting coating, a hot stamp adhesive 62 is applied and cured. To form a Chromagram, the coated first substrate having the hot stamp adhesive 62 is bonded with a second substrate covered with the same layers as in the embodiment shown in FIG. 2a.

Figure 2C:
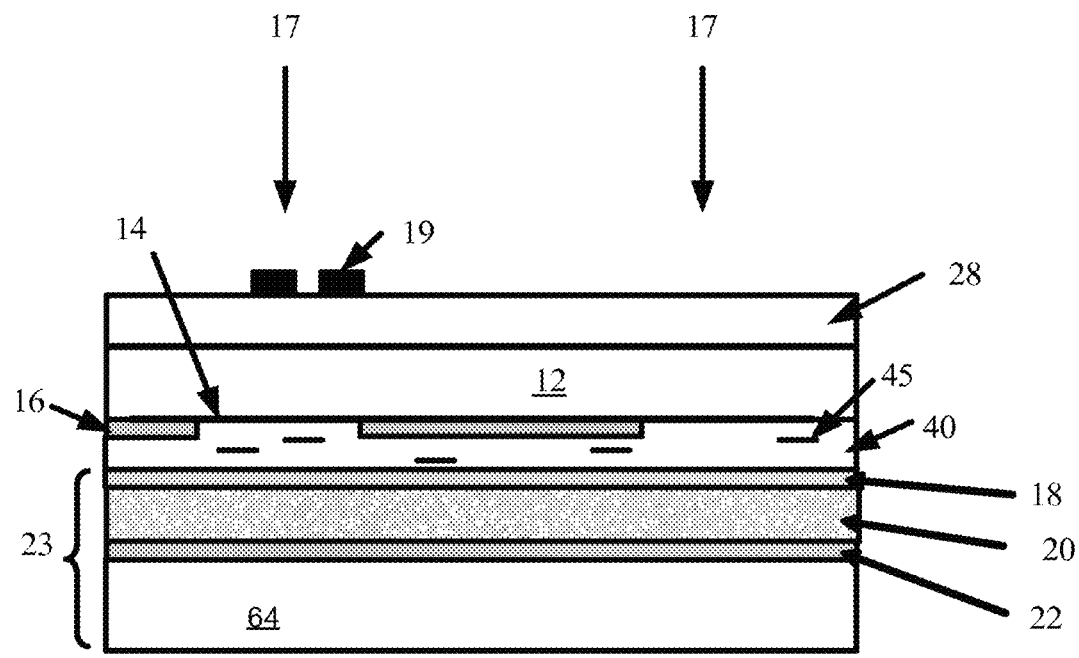
FIG. 2*c* is a cross-sectional view of a Chromagram with a clear adhesive between the foil and demetallized hologram, wherein the adhesive contains covert flakes or a low concentration of optically variable flakes or optically variable magnetic flakes.
Figure 2D:
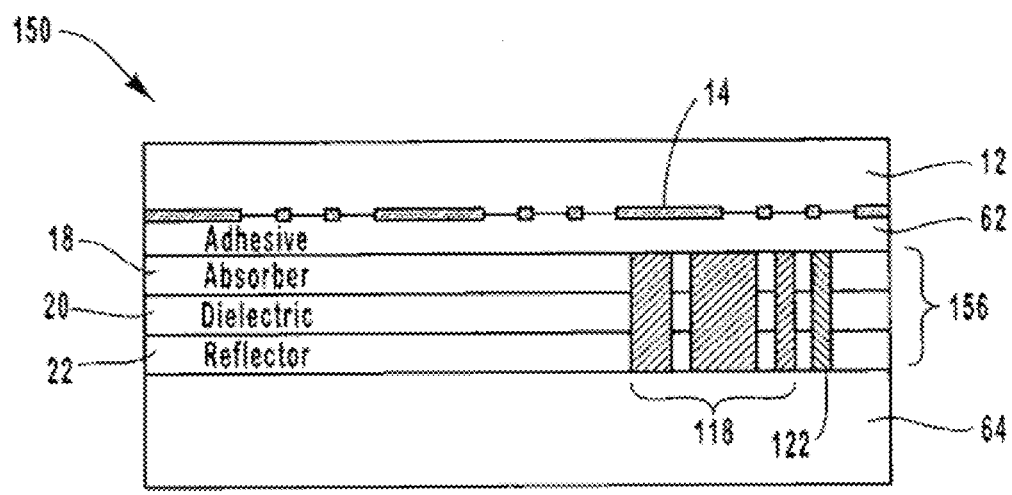
FIG. 2*d* is a cross-sectional view of a Chromagram wherein an OV structure includes a laser ablated insignia.
Figure 2E:
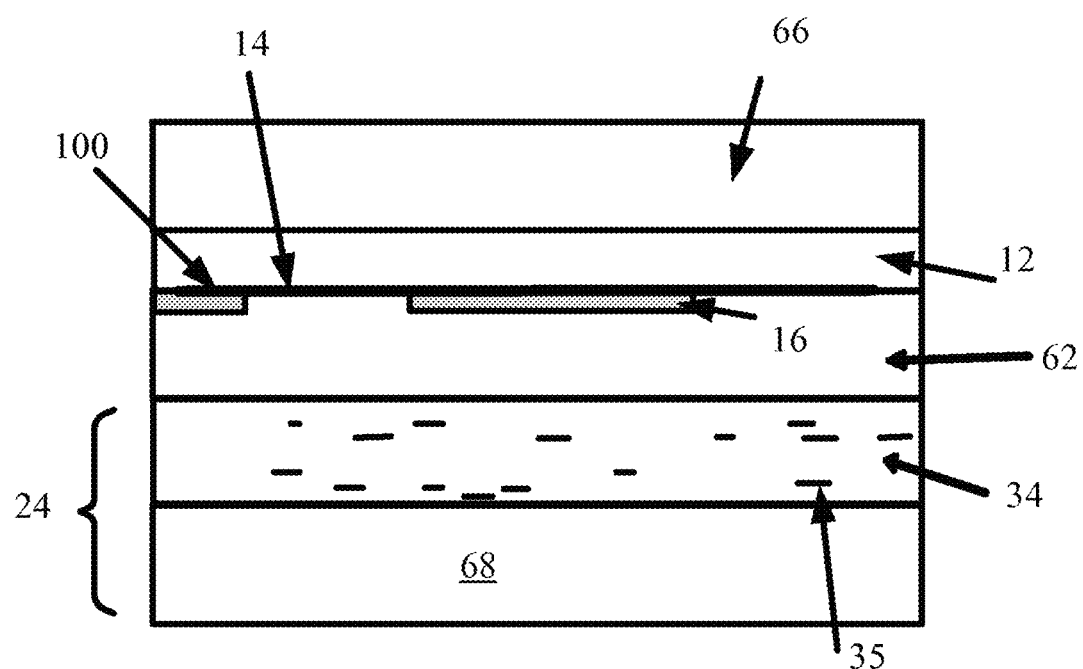
FIG. 2*e* is a cross-sectional view of a Chromagram according to another embodiment of this invention.

With reference to FIG. 2e, in another embodiment of the present invention, substrate 68 is a banknote or any other type security document. A security structure is formed by printing a color shift ink onto banknote 68 as a background color, and then hot-stamping a demet hologram, preferably embossed onto resin/hardcoat layer 12 and supported by carrier sheet 66, over the ink using transparent hot stamp adhesive 62. Optionally, adhesive 62 contains other particles or flakes to modify the color of the color shift ink or as a covert security feature. By way of example, adhesive 62 may contain fluorescent materials, covert charms, such as disclosed in U.S. Patent Application 20050037192 by Argoitia et al, upshift phosphors, interference pigments like mica-based interference flakes, and non-shifting pigments or dyes. The covert flakes are detectable under a microscope, whereas for the fluorescent and phosphor materials, irradiation of the device by UV or IR light is required to activate those features. Since resin/hardcoat layer 12 is quite thin, preferably less than 3 microns, the UV or IR light is able to penetrate to the particles in adhesive 62. In FIG. 2e, a release layer, resin layer and hard coat are shown as one layer 12 providing functionality of each of the three layers. In other embodiments, layer 12 is replaced by any combination of separate layers: a resin layer for embossing, a release layer for releasing the demet hologram from carrier sheet 66, and a hard coat layer for durability of the transferred device. The adhesive layer 62 which couples the optically variable and diffractive structures is an internal adhesive layer of the Chromagram device; an external layer of adhesive may be applied e.g. to the substrate 68 (its lower surface with reference to FIG. 2e) for adhering the Chromagram device to an object.

In another embodiment of the present invention, similar to the structures shown in FIGS. 2a and 2b, an OV structure used in place of structure 10b is transparent. By way of example, the transparent OV structure is one having a low density of optically variable flakes incorporating opaque Fabry Perot filters, or one based on all dielectric transparent optically variable flakes, or like one described in U.S. Pat. No. 5,278,590. When this construction is viewed through the OV film, a superposition of the holographic and optically variable effects is visible. In essence, the rainbow of colors that were in the initial hologram has been modified by the OV structure, such as an optical stack, whereby some colors are accentuated and some are suppressed. Actually, the hologram can be viewed from both sides; on one side the original hologram can be seen combined with OV background in windows of the reflective layer covering the hologram, and on the other side, the superposition of the hologram and the optical stack can be seen through the OV film.

In FIG. 2c, covert flakes 45 that cannot be seen with the unaided eye are mixed into the hot stamp adhesive 40 used to bond the two structures together as in the previous embodiments. The examples of covert flakes include, but not limited to, charms or taggants as taught in United States patent application publication number 2006/0035080 incorporated herein by reference, shaped pigments as disclosed in United States patent application publication number 20060035080, magnetic flakes, fluorescent pigments, standard UV activated to form visible light, or specialized anti-Stokes materials UV activated to form visible light.

These covert flakes serve as a means of authentication. If the covert flakes provide an optical effect, for example under a microscope or being IR activated, additionally to holographic effects exhibited by this structure, though the windows where the Al coating is missing, covert flakes 45 can be seen on color shifting background.

In another embodiment, optically variable flakes are added to adhesive 40 at low concentrations so that the OV foil colors are modified when viewing from the top.

According to another embodiment of the present invention, FIG. 2d, depicts a security article 150 including a light transmissive substrate 12 with an optical interference pattern 14 and a color shifting optical coating 156 that is laminated to substrate 12 by way of an adhesive layer 62. The optical coating 156 includes and absorber layer 18, dielectric layer 20, and a reflector layer 22. The optical coating 156 is deposited on carrier sheet 64 to form a prelaminate structure prior to being laminated to substrate 12. The prelaminate structure is subjected to a laser imaging process to form both laser ablated image 118 as well as laser scribed number 122. As shown in FIG. 2d, the optical coating 156 is laminated to substrate 12 so as to be adjacent to optical interference pattern 14 such as a holographic or diffractive pattern.

The structure shown in FIG. 2d, when viewed from the top, provides a combination of an opaque image, that may be reflective, formed by pattern 14, a color-shifting background visible in the windows of pattern 14, and covert flakes which may be added to adhesive 62. When the structure is viewed from the opposite side, laser ablated image 118 and laser scribed number 122 are visible on the substrate 64 of the reflective surface of the OV stack if substrate 64 is transparent. If hologram 14 is of the transmissive type, for example relief is coated with a high index layer of ZnS (not shown), then the laser ablated image and the number will also be visible from the top.

Conveniently, the aforedescribed manufacturing process allows the first and second substrates to be manufactured in two different facilities and stored in rolls to be united later.

Conveniently, the second substrate may have any type of optical effect coating thereon that can be seen through windows in the first substrate. Conveniently any of these first windowed substrates can be married to these second coated substrates at a later time or immediately, by way of hot stamping the two together or by hot roll laminating.

In another embodiment of the present invention, alternatively to hot-stamping, a UV activated adhesive is used to bond the two structures together. By way of example, an optically variable foil printed with an adhesive is brought together with a laminating sheet containing the demet hologram; the adhesive is then cured by irradiating the laminating sheet with UV light, wherein the laminating sheet has a transparent or at least UV light-transmissive substrate. One way to overcome the obstacle to UV light posed by the reflective metal covering the hologram, is to use a patterned or windowed reflective layer wherein areas covered with metal are very narrow, estimated to be less than 2 microns, so that UV light can cure the adhesive by coming in at an angle. Another way is to use a semitransparent reflective layer in the OV structure or to use e-beam curing.

Figure 3A:
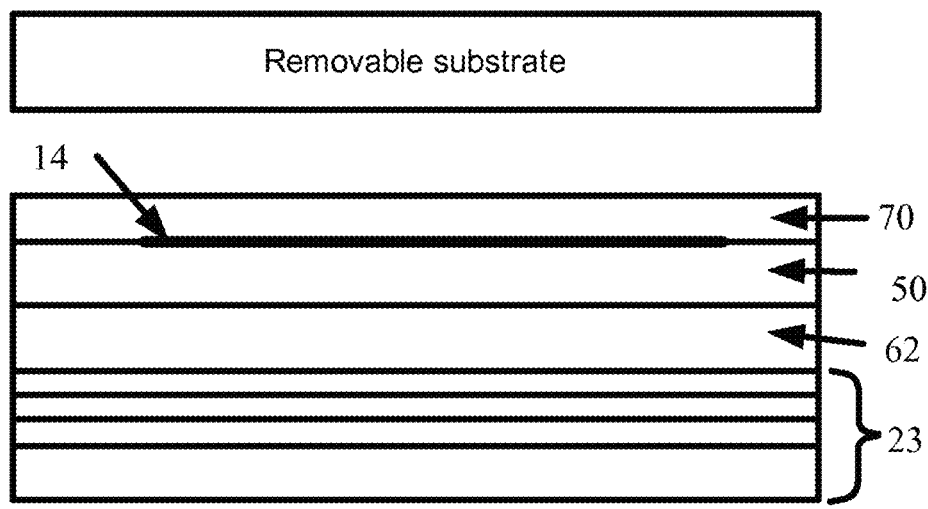
FIG. 3a is a cross-sectional view of a Chromagram wherein a grating is supported by, or formed therein, a layer of high refraction index material.

In one embodiment of the present invention, shown in FIG. 3a, optically variable structure 23 is laminated onto grating 14 using adhesive 62, wherein grating 14 is supported by, or formed therein, hardcoat/resin layer 70 and covered with layer of high refraction index material 50. The structure of this embodiment provides a color shifting holographic image by combining the effects of the optically variable and diffractive structures. A transparent OV foil can be used in place of structure 23.

Figure 3B:
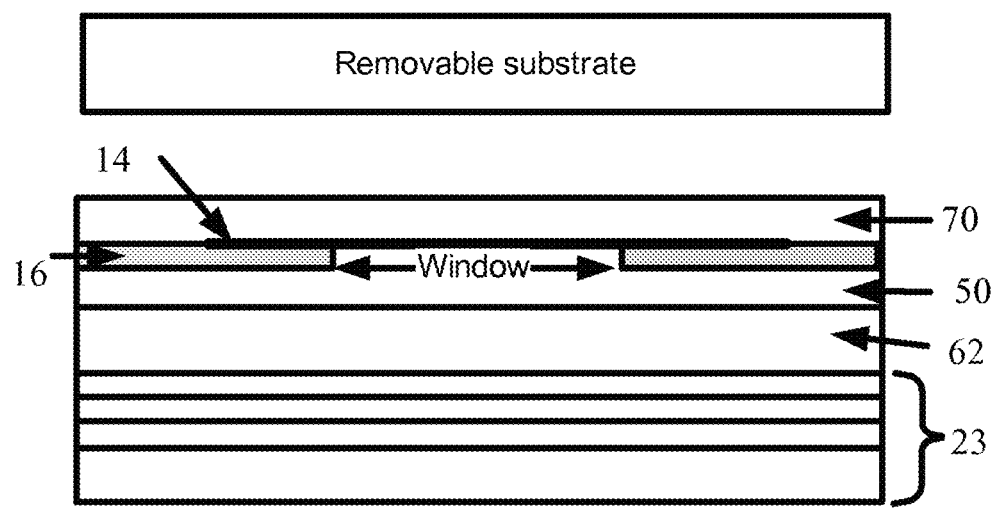
FIG. 3b is a cross-sectional view of a Chromagram wherein a demet hologram is supported by, a layer of high refraction index material.

In another embodiment of the present invention shown in FIG. 3b, optically variable foil 23 is laminated using adhesive 62 onto grating 14 covered by patterned reflective layer 16, wherein grating 14 is supported by, or formed therein, hardcoat/resin layer 70 and covered with layer of high refraction index material 50. By as of example, OV foil 23 is a transparent all dielectric color shift with angle coating or one based on a semi-transparent/dielectric/semi-transparent color shift filter. When viewed from the top, as shown in FIG. 3b, this structure provides a combined optical effect, wherein a specular holographic image formed by light reflected from opaque metallic layer 16, is complemented by a lower reflecting holographic image with a color shifting background from the OV foil 23 formed by light reflecting from the regions where reflective layer 16 has windows.

In a structure similar to the structure shown in FIG. 3b but without a high refraction index coating, regions wherein reflective layer 16 has windows may show very weak holographic effects. This is very much dependent upon the of index matching between the coating underlying the non-aluminized portion of the hologram and the adhesive. If there is a refractive index differential of at least 0.2 for the real part of the refractive index, then some holographic effects will be seen. The greater the refractive index differential, the more clearly the hologram will be seen. By way of example, a refractive index differential of 0.8, between a substrate with n=1.5 and high index coating with n=2.3, provides brightness to a transparent hologram. In contrast, if the refractive index of the coating is matched, then no holographic effects will be seen in the windows.

In reference to FIGS. 3a and 3b, high refraction index coating 50 has an index of refraction no less than 1.65. Suitable examples of such a high index transparent layer include $TiO_2$ or ZnS.

In one embodiment of the present invention, adhesive layer is patterned so that the diffractive structure has regions not bonded to the optically variable structure.

In another embodiment of the present invention, the adhesive layer is patterned so that one of the structures, by way of example a OV foil, is bonded to the substrate supporting the second structure, a hologram in our example, forming a frame, or a part of it, around the hologram.

Figure 4:
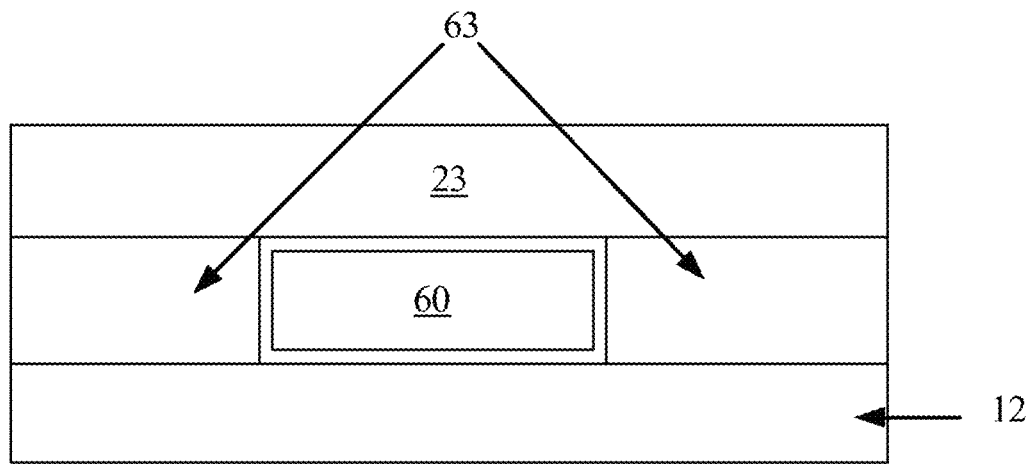
FIG. 4 is a cross-sectional view of a Chromagram wherein an OV structure is adhesively bonded to the substrate supporting a diffractive structure, whereas the OV and diffractive structures are coupled by pressure.

In one embodiment, shown in FIG. 4, diffractive structure 60 is adjacent to substrate 12, but smaller, so that the top surface of substrate 12 has regions which are not covered with diffractive structure 60. Instead, at least some of these regions are covered with adhesive material thus forming patterned adhesive layer 63 for bonding optically variable foil 23 to substrate 12, whereas diffractive structure 60 is not adhesively bonded to adjacent layers, but is coupled to them by the surrounding adhesive. The pattern of adhesive layer 63 can vary, in particular, adhesive 63 can form a frame around diffractive structure 60 or, in case of elongated hologram 60, adhesive 63 is applied along two longer sides of hologram 60.

In one embodiment of the present invention, comprising a demetallized hologram hot stamped onto an optically variable foil, a patterned layer of color shifting ink is deposited underneath the demet hologram. This allows the color shift from the foil to show though to the observer. The flakes of the optically variable ink are generally opaque so that a continuous coating of ink would block out the underlying foil. Alternatively, the color shifting ink has a low concentration of flakes so that the color shift of the foil could still be seen though the optically variable ink; the foil colors are modified by the partially transparent optically variable ink. Alternatively, a patterned layer of the optically variable ink is deposited on the top side of the demet hologram, so that both the color shift from the ink and from the OV foil are visible.

Figure 5:
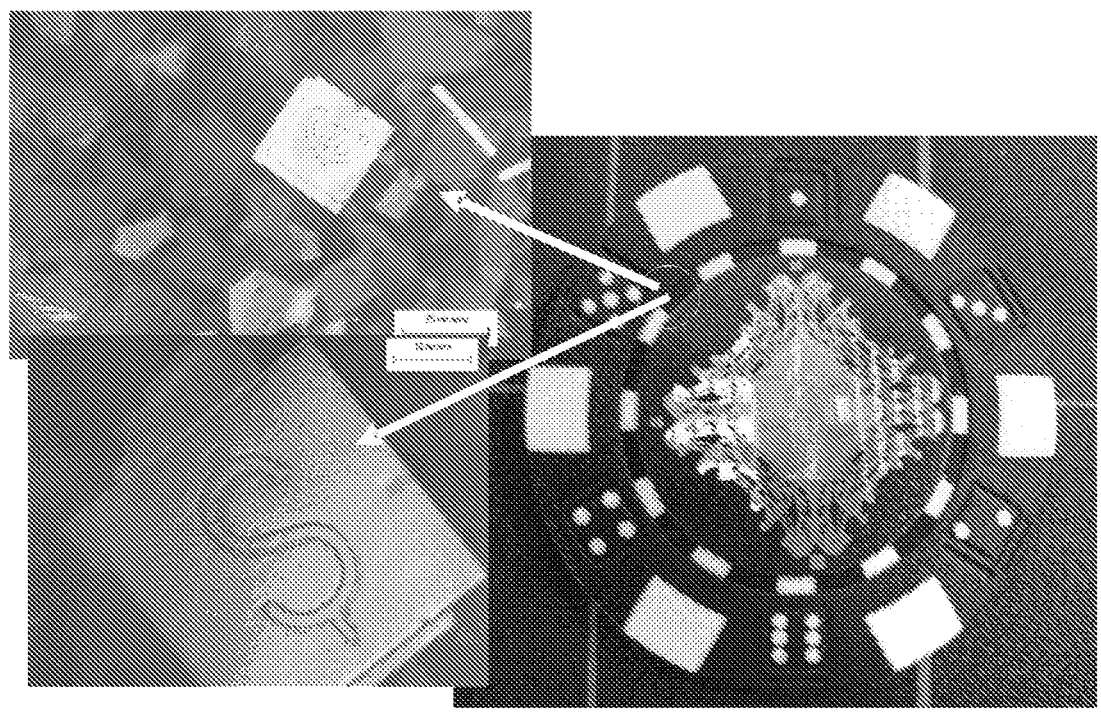
FIG. 5 is a view of a poker chip made in accordance with the invention wherein covert flakes having symbols thereon are provided within the coating in a similar manner to FIG. 2c.

Referring now to FIG. 5 a poker chip is shown having covert flakes bearing indicia in the form of a Euro symbol and a $ symbol that is only visible to the human eye with about 100 times magnification. Preferably, these covert flakes are provided within the hot stamp adhesive on one of the two optical structures.

What we claim is:

1. A method of manufacturing a device for providing an image having an optically variable feature, comprising:
   a) providing a diffractive structure;
   b) providing an optically variable structure distinct from the diffractive structure, wherein the optically variable structure comprises a first reflector layer, an absorber layer, and a dielectric layer between the reflector and absorber layers;
   c) covering the diffractive structure or the optically variable structure with an adhesive; and,
   d) after steps (a)-(c), activating, with energy, the adhesive and coupling the diffractive structure and the optically variable structure together, wherein the energy activated adhesive forms a layer;
   wherein the diffractive structure comprises a relief pattern and a high refraction index layer made of a material having an index of refraction no less than 1.65; and
   wherein the diffractive structure comprises a patterned opaque coating so that the diffractive structure has opaque regions and light transmissive regions.

2. The method as defined in claim 1, wherein the opaque regions are configured for preventing light incident on the diffractive structure from propagating through to the optically variable structure via the layer of the energy activated adhesive, and light transmissive regions are configured for allowing light incident on the diffractive structure to propagate through to the optically variable structure via the layer of the energy activated adhesive.

3. The method as defined in claim 1, wherein the patterned opaque coating is a second reflector layer.

4. The method as defined in claim 3, wherein the second reflector layer is partially demetallized.

5. The method as defined in claim 4, wherein the second reflector layer is segmented so that the reflector layer has one or more light transmissive windows, so that the optically variable structure is visible through said windows.

6. The method as defined in claim 3 wherein the optically variable structure comprises a coating with a plurality of multilayer optical interference flakes therein or thereon.

7. The method as defined in claim 1, wherein step (a) comprises providing a substrate having a first side supporting the diffractive structure, wherein the first side of the substrate has a first region wherein the diffractive structure is therein or thereon, and the first side of the substrate has a second region wherein the diffractive structure is absent, and in step (c) the layer of the energy activated adhesive is adjoined to the first side of the substrate so that the optically variable structure is adhesively bound solely to the substrate and coupled to the diffractive structure by the surrounding adhesive.

8. A device manufactured by the method defined in claim 1.

9. The method as defined in claim 1, wherein the diffractive structure includes a grating to form a light transmissive region for allowing light incident on the diffractive structure to propagate through to the optically variable structure via the layer of the energy activated adhesive.

10. The method as defined in claim 1, wherein the diffractive structure includes indicia.

11. The method as defined in claim 1, wherein the diffractive structure includes a substrate having the grating impressed on a surface of the substrate.

12. The method as defined in claim 1, wherein the diffractive structure includes a protective coating.

13. The method as defined in claim 1, wherein the adhesive includes covert flakes.

14. The method as defined in claim 13, wherein the covert flakes include charms, taggants, shaped pigments, magnetic flakes, or fluorescent pigments.

15. The method as defined in claim 1, wherein in step c) the adhesive covers the diffractive structure or the optically variable structure in a pattern.

16. The method as defined in claim 15, wherein the diffractive structure has regions not bonded to the optically variable structure based upon the pattern.

17. The method as defined in claim 15, wherein the pattern of adhesive forms a frame around the diffractive structure.

18. A method of manufacturing a device for providing an image having an optically variable feature, comprising:
 a) providing a diffractive structure;
 b) providing an optically variable structure distinct from the diffractive structure, wherein the optically variable structure comprises a first reflector layer, an absorber layer, and a dielectric layer between the reflector and absorber layers;
 c) activating, with energy, an adhesive to couple the diffractive structure and the optically variable structure together, wherein the energy activated adhesive forms a layer;
 wherein the diffractive structure comprises a relief pattern and a high refraction index layer made of a material having an index of refraction no less than 1.65; and
 wherein the diffractive structure comprises a patterned opaque coating so that the diffractive structure has opaque regions and light transmissive regions.

19. The method as defined in claim 18, wherein the adhesive comprises covert flakes.

20. The method as defined in claim 18, wherein the adhesive comprises optically variable flakes.

* * * * *